United States Patent
Joshi

(10) Patent No.: US 10,837,340 B2
(45) Date of Patent: Nov. 17, 2020

(54) METHOD FOR OPERATING A FEED MODULE OF AN SCR CATALYTIC CONVERTER SYSTEM

(71) Applicant: Robert Bosch GmbH, Stuttgart (DE)

(72) Inventor: Rohit Joshi, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/535,272

(22) Filed: Aug. 8, 2019

(65) Prior Publication Data

US 2020/0049049 A1 Feb. 13, 2020

(30) Foreign Application Priority Data

Aug. 9, 2018 (DE) .................. 10 2018 213 382

(51) Int. Cl.
*F01N 3/20* (2006.01)
(52) U.S. Cl.
CPC .......... *F01N 3/208* (2013.01); *F01N 2240/25* (2013.01); *F01N 2900/0422* (2013.01)
(58) Field of Classification Search
CPC ................. F01N 3/208; F01N 2240/25; F01N 2900/0422; F01N 2610/144; F01N 2610/14; F01N 2610/1486; F01N 2610/1493; F01N 2610/1473; F01N 2900/1822; F01N 2900/1806; F01N 2610/10; F01N 2610/02; F01N 9/00; F01N 2610/105; F01N 2610/1433; F01N 2900/1811; Y02T 10/40; Y02T 10/12
USPC .................................... 60/286, 299, 300, 301
See application file for complete search history.

(56) References Cited

U.S. PATENT DOCUMENTS

| 6,568,416 | B2 * | 5/2003 | Tucker | G05D 16/2053 |
| | | | | 137/14 |
| 9,574,477 | B1 * | 2/2017 | Burger | F04B 19/22 |
| 10,704,443 | B2 * | 7/2020 | Kleinknecht | B01D 53/9409 |
| 2013/0036724 | A1 * | 2/2013 | Hodgson | F01N 3/208 |
| | | | | 60/286 |
| 2015/0068194 | A1 * | 3/2015 | Gottwald | F01N 3/208 |
| | | | | 60/274 |

FOREIGN PATENT DOCUMENTS

| DE | 102010030860 A1 | 1/2012 |
| DE | 102011088701 A1 | 6/2013 |
| DE | 102011088704 A1 | 6/2013 |
| DE | 102015216745 A1 | 3/2017 |
| DE | 102016117949 A1 | 4/2017 |
| DE | 102016210847 A1 | 12/2017 |
| DE | 102016217842 A1 | 3/2018 |
| DE | 102016010749 A1 | 4/2018 |
| EP | 3085912 A1 | 10/2016 |

* cited by examiner

*Primary Examiner* — Hoang M Nguyen
(74) *Attorney, Agent, or Firm* — Michael Best & Friedrich LLP

(57) ABSTRACT

A method for operating a feed module of an SCR catalytic converter system which has a feed pump, a feedback pump and a hydraulic interface channel. The feed module is operated in a test state in which a feed operation of the feed pump takes place and a feed operation of the feedback pump does not take place. Owing to a time profile of an MSP current ($I_{MSP}$) of the feed pump it is decided in the test state whether the feed module is to change into a thawing state.

19 Claims, 4 Drawing Sheets

METHOD FOR OPERATING A FEED MODULE OF AN SCR CATALYTIC CONVERTER SYSTEM

BACKGROUND OF THE INVENTION

The present invention relates to a method for operating a feed module of an SCR catalytic converter system. Furthermore, the present invention relates to a computer program which carries out each step of the method and to a machine-readable storage medium which stores the computer program. Finally, the invention relates to an electronic control device which is configured to carry out the method.

In order to reduce nitrogen oxides in the exhaust gas of internal combustion engines, in particular of diesel engines, it is known to arrange an SCR (Selective Catalytic Reduction) catalytic converter in the gas region of said engines. This catalytic converter reduces the nitrogen oxides in the presence of a reducing agent to form nitrogen. Ammonia is used as the reducing agent. In order to introduce this reducing agent into the SCR catalytic converter, an aqueous urea solution (AUS) is usually injected into the exhaust gas train upstream of the SCR catalytic converter so that the latter splits off ammonia. 32.5 percentage AUS is commercially available under the trade name AdBlue®. The latter has a freezing point of −11.5° C. At low ambient temperatures, the feed module of an SCR catalytic converter system which feeds the AUS from a tank to a metering valve has to be thawed before it can be used to feed the AUS. For this purpose, it is operated in a thawing state whose duration is selected as a function of the ambient temperature.

SUMMARY OF THE INVENTION

The method serves to operate a feed module of an SCR catalytic converter system which has a feed pump, a feedback pump and a hydraulic interface channel. The feed pump serves to feed AUS from a tank to a metering valve. The feed pump permits, before the feed module is switched off, feeding back of AUS from the metering valve and from the hydraulic system of the feed module in order to prevent damage owing to the pressure of the ice at low ambient temperatures. The hydraulic interface channel can be a component which permits the transfer of the AUS from the feed module to the metering valve.

In the method, the feed module is operated in a test state in which a feed operation of the feed pump can take place but feed operation of the feedback pump cannot take place. In the test state, a time profile of an MSP (Magnet Stop Point) current of the feed pump is measured and on the basis of this time profile it is decided whether the feed module is to change into a thawing state. The MSP current is a local maximum in the pump current profile of the feed pump, which maximum is caused by a stop of its actuator. Therefore, one MSP occurs per pump stroke, and the MSP current is obtained from the times and electrical currents of the MSPs.

The time profile of the MSP current is influenced by frozen AUS in the working space of the feed pump, in the working space of the feedback pump and in the hydraulic system of the feed module. The method therefore permits a precise statement to be made as to whether it is possibly necessary to change the feed module again into a thawing state or whether it can change into a normal operating state in which AUS can be metered into the exhaust train upstream of an SCR catalytic converter. While known methods, which estimate the anticipated thawing time on the basis of the ambient temperature, have to provide a safety margin in order to ensure that frozen AUS is no longer located in the system, precise analysis of the feed module using the present method makes it possible to activate the SCR catalytic converter earlier.

In one embodiment of the method there is provision that the feed module starts in a test state, in order to check whether it is immediately available for the metering in of the AUS or whether it must firstly be operated in a thawing state. This test state has a first test phase and a second test phase. In the first test phase, the feedback pump is opened so that AUS can flow through it. In the second test phase, the feedback pump is closed so that it prevents AUS from flowing back through a feedback line of the feed module into the tank. Both the time profile of the MSP current in the first test phase and a time profile of the MSP current in the second test phase are taken into account in the decision as to whether the feed module is to change into the thawing state.

In particular the following conclusions can be drawn from the profile of an MSP current in the first test phase:

a. If at least one expected measured value of the MSP current cannot be detected or if at least one measured value of the MSP current differs at least by a first threshold value from the first measured value of the time profile of the MSP current, at least one of the following elements of the feed module is blocked by frozen AUS: the working space of the feed pump, the connection of the feed pump to the tank, the working space of the feedback pump, the connection of the feedback pump to the tank or the hydraulic connection between the feed pump and the feedback pump. The same conclusion can also be drawn if at least one measured value of the MSP current exceeds a predefined maximum value.

b. If, on the other hand, none of these conditions is met but a rise in the MSP current over time exceeds a second threshold value, it can be concluded from this that although the working space of the feed pump and the connection thereof to the tank are free, at least one of the following elements of the feed module is blocked by frozen AUS: the working space of the feedback pump, the connection of the feedback pump to the tank or the hydraulic connection between the feed pump and the feedback pump.

c. If the rise in the MSP current over time does not exceed the second threshold value, it is not, however, possible to detect fluid in the working space of the feed pump, for example, by means of a software function, it is thus possible to infer that the working space of the feed pump is free but at least one of the following elements of the feed module is blocked by frozen AUS: the connection of the feed pump to the tank, the working space of the feedback pump, the connection of the feedback pump to the tank or the hydraulic connection between the feed pump and the feedback pump.

If it has been inferred from the MSP current in the first test phase that at least one element of the feed module is blocked, it is decided that the feed module is to change into the thawing state.

If it has not already been decided in the first test phase that the feed module is to change into the thawing state, the MSP current in the second test phase is also analyzed. In particular if a rise in the MSP current over time exceeds a second threshold value in the second test phase it can be inferred that although the working spaces of the feed pump and of the feedback pump as well as the connection of the feed pump to the tank, the connection of the feedback pump to the tank and the hydraulic connection between the feed pump and the feedback pump are free, the hydraulic interface channel is blocked by frozen HSW. In this case it is decided that the feed module is to change into the thawing state. This decision is made even if one of the conditions specified under point a. should be satisfied in the second test phase. Otherwise it is ready for the metering mode.

In a thawing state of the feed module, the actuators of the feed pump and of the feedback pump are usually energized with a current which is not sufficient to trigger a feed stroke but merely serves to heat the actuators. This thawing state must occasionally be interrupted by venting phases in which the feed pump changes into a feed operation and the feedback pump is opened without feeding. In this way, air bubbles which arise in the hydraulic system as a result of the heating are driven out of said system. In one embodiment of the method, such a venting phase can be used at the same time as the test state in order to decide whether it is necessary to return the venting phase into the thawing state or whether the feed module is in the meantime ready to meter. If at least one predefined number of expected measured values of the MSP current cannot be detected within a predefined time interval or if at least one measured value of the MSP current differs at least by a first threshold value from the measured value in the time profile of the MSP current or if at least one measured value of the MSP current exceeds a predefined maximum value or if a rise in the MSP current over time exceeds a second threshold value or it does not exceed the second threshold value but fluid cannot be detected in the working space of the feed pump, a renewed change into the thawing state is necessary. However, if none of these conditions is satisfied, it can subsequently be provided, in particular, that the feed module changes into the second test phase described above, in order to rule out blockage of the hydraulic interface channel before it is enabled for the metering mode.

In particular if blockage of the hydraulic interface channel has been detected in the second test phase and therefore a change into the thawing mode is to take place, this thawing mode can take place in the form of a heating assistance phase for the hydraulic interface channel. In this heating assistance phase, a heating operation and a feed operation of the feed pump can take place at the same time. The feedback pump is opened in this context. This heating assistance phase is joined, in particular, by a pressure build-up phase in which the feedback pump is closed. Heated AUS is then forced under pressure into the hydraulic interface channel, in order to heat frozen AUS which is present there. Such a pressure build-up phase can also be used as a test state. If at least one predefined number of expected measured values of the MSP current cannot be detected within a predefined time interval within the pressure build-up phase or at least one measured value of the MSP current differs at least by a first threshold value from the measured value in the time profile of the MSP current or at least one measured value of the MSP current exceeds a predefined minimum value or a rise in the MSP current over time exceeds a second threshold value it can then be inferred that frozen AUS is still located in the hydraulic interface channel, which requires a renewed change into the thawing state, in particular in the form of a heating assistance phase. Otherwise, the feed module is then ready for metering.

The computer program is configured to carry out each step of the method, in particular when it runs on a computing device or electronic control device. It permits the implementation of different embodiments of the method on an electronic control device, without having to make structural changes thereto. For this purpose, it is stored on the machine-readable storage medium. By transferring the computer program to a conventional electronic control device, an electronic control device is obtained which is configured to operate a feed module of an SCR catalytic converter system by means of the method.

BRIEF DESCRIPTION OF THE DRAWINGS

Exemplary embodiments of the invention are illustrated in the drawings and are explained in more detail in the following description.

DETAILED DESCRIPTION

Figure 1:
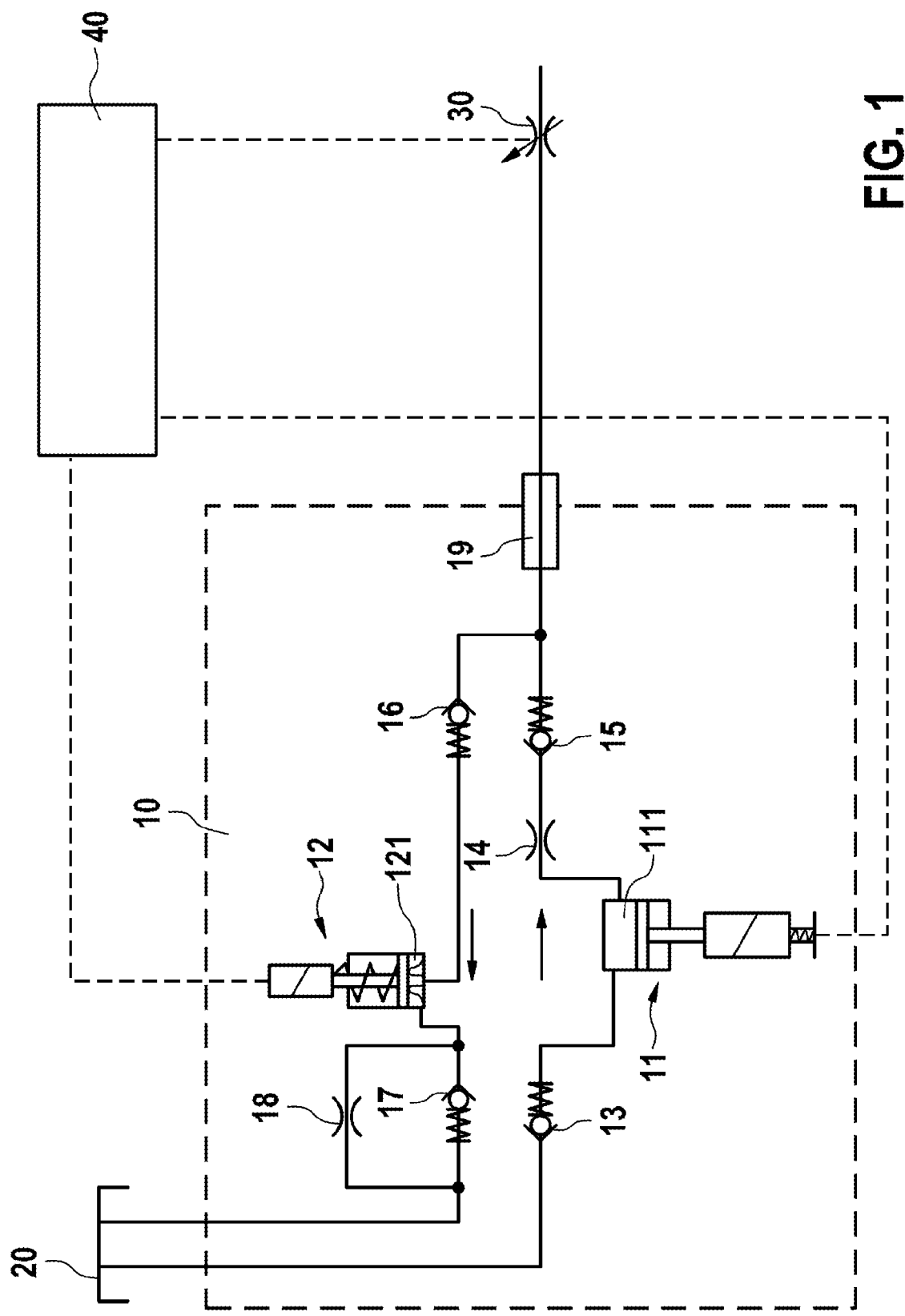
FIG. 1 shows a schematic view of a feed module which can be operated by means of embodiments of the method according to the invention.
Figure 2:
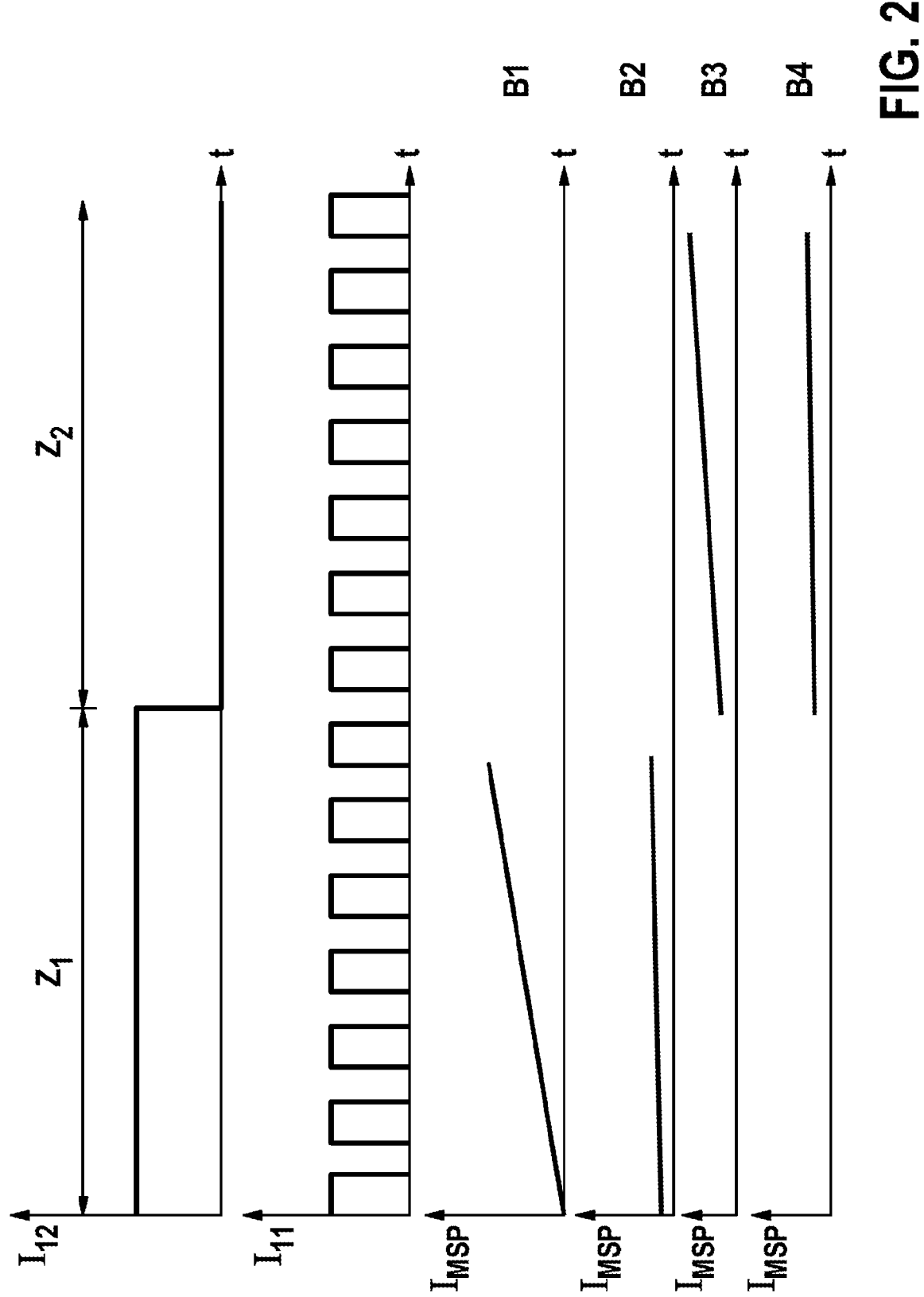
FIG. 2 shows current profiles over time in a plurality of diagrams in an exemplary embodiment of the method according to the invention.

A feed module 10 which is illustrated in FIG. 1 serves to feed AUS from a tank 20 to a metering valve 30. It is controlled by an electronic control device 40. A feed pump 11 and a feedback pump 12 are arranged in the feed module 10. The two pumps 11, 12 are each embodied as reciprocating piston diaphragm pumps. A feed line leads from the tank 20 through a first non-return valve 13 into a working space 111 of the feed pump 11. From there it leads on through a first restrictor 14 and a second non-return valve 15 to a branching point via which it is connected to a feedback line. The feedback line leads through a third non-return valve 16 into a working space 121 of the feedback pump 12. From there it leads through a fourth non-return valve 17 back into the tank 20. A bypass in which a second restrictor 18 is arranged bypasses the fourth non-return valve 17. Beyond the branching point, the feed line leads through a hydraulic interface channel 19 to the metering valve 30.

If the feed module 10 is activated, in one exemplary embodiment of the method, it starts in a first test phase $Z_1$. In the latter the feedback pump 12 is energized by means of a feedback pump current $I_{12}$ in such a way that its working space 121 is open and the throughflow of AUS is permitted. The feed pump 11 is energized by means of a feed pump current $I_{11}$ in such a way that it carries out feed strokes. An MSP current $I_{MSP}$ of the feed pump 11 is read out in the first test phase $Z_1$.

In a first example, B1, the MSP current $I_{MSP}$ rises with each feed stroke of the feed pump 11. It is inferred from this that the hydraulic connection from the tank 20 through the feed pump 11, the feedback pump 12 and back into the tank 20 is not free of ice and the electronic control device 40 does not bring about a change of the feed module 10 into a thawing state. However, in one example B2 the MSP current $I_{MSP}$ is essentially constant, which means that its rise is below a predefined threshold value. The feed module 10 then changes into a second test phase $Z_2$ in that the energization of the feedback pump 12 is broken off, so that its working space 121 closes. The energization of the feed pump 11 is, in contrast, continued in the same way as in the first test phase $Z_1$. In one example B3, a rise of the MSP current $I_{MSP}$ occurs in the second test phase $Z_2$. It is inferred from this that the hydraulic interface channel 19 is frozen and the electronic control device 40 in turn initiates a thawing state. However, in one example B4, the MSP current $I_{MSP}$ in the second test phase $Z_2$ is essentially constant, in response to which the feed module 10 is detected as ready for metering and changes into a metering mode.

Figure 3:
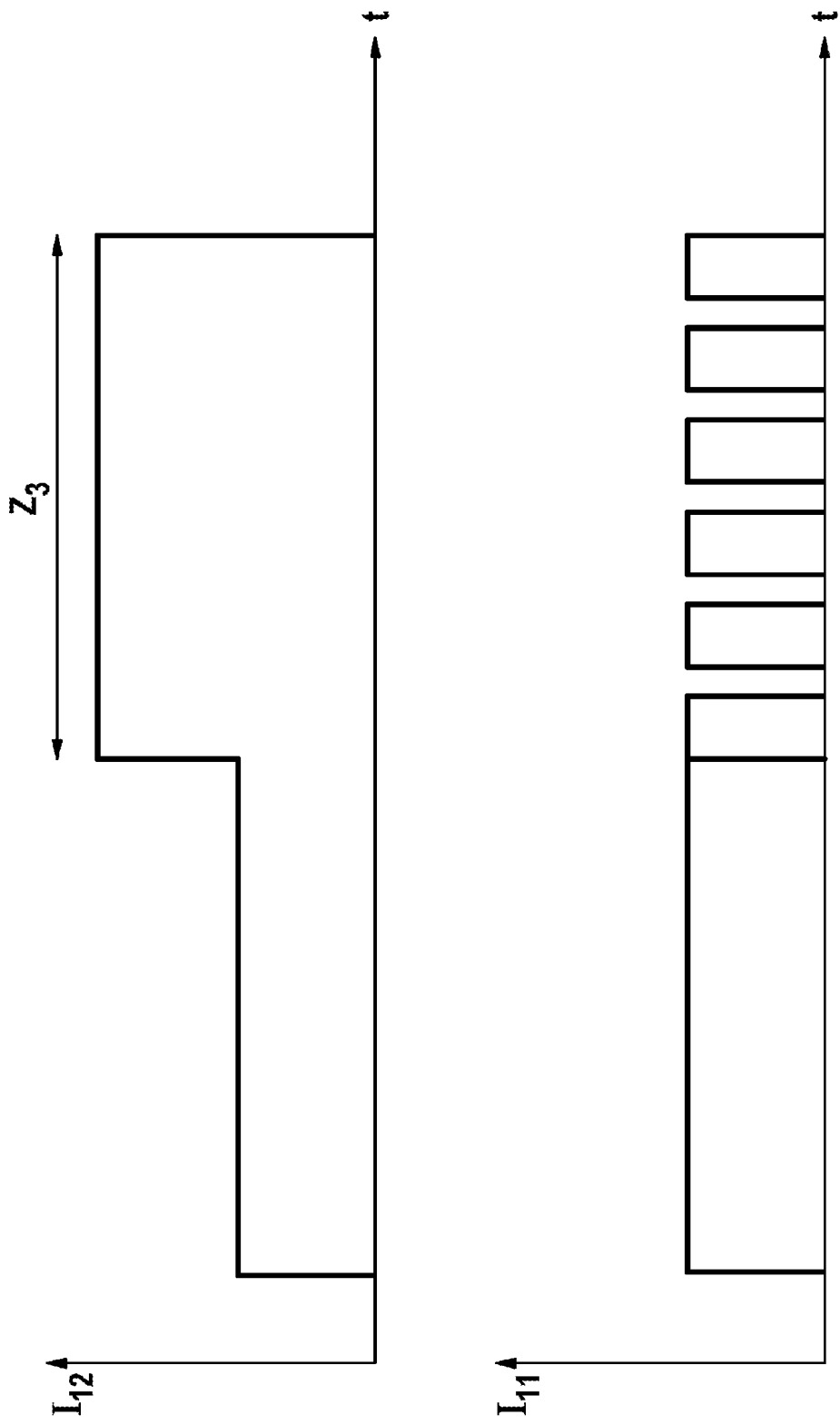
FIG. 3 shows current profiles over time in diagrams in another exemplary embodiment of the method according to the invention.

If a thawing state is already initiated in the first test phase $Z_1$, this occurs in the way illustrated in FIG. 3. Firstly, the feed pump 11 and the feedback pump 12 are energized with a constant feed pump current $I_{11}$ and constant feedback pump current $I_{12}$, in order to generate heat in the actuators of the pumps 11, 12, which heats the components of the feed module 10. Then, in a venting phase $Z_3$ the feedback pump current $I_{12}$ is increased even further in order to completely open the working space 121 of the feedback pump 12. The feed pump 11 is energized in such a way that it executes feed strokes in order to vent the feed module 10. In this context, the MSP current $I_{MSP}$ is monitored. If the latter rises, a return into the thawing state occurs. If, on the other hand, it remains essentially constant, a change into the second test phase $Z_2$ occurs.

Figure 4:
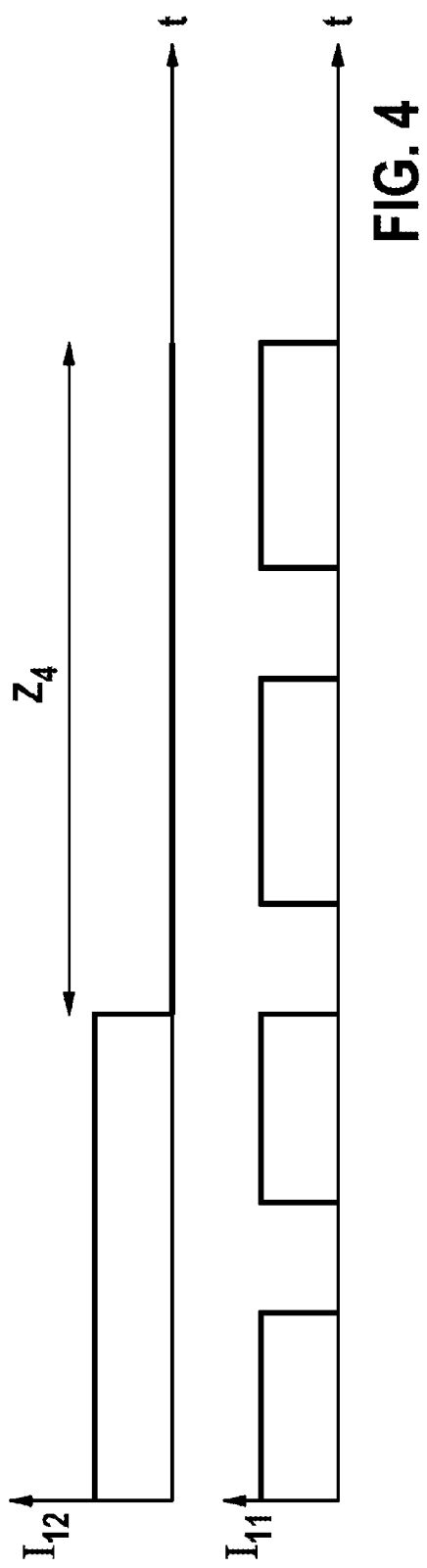
FIG. 4 shows current profiles over time in diagrams in yet another exemplary embodiment of the method according to the invention.
Figure 5:
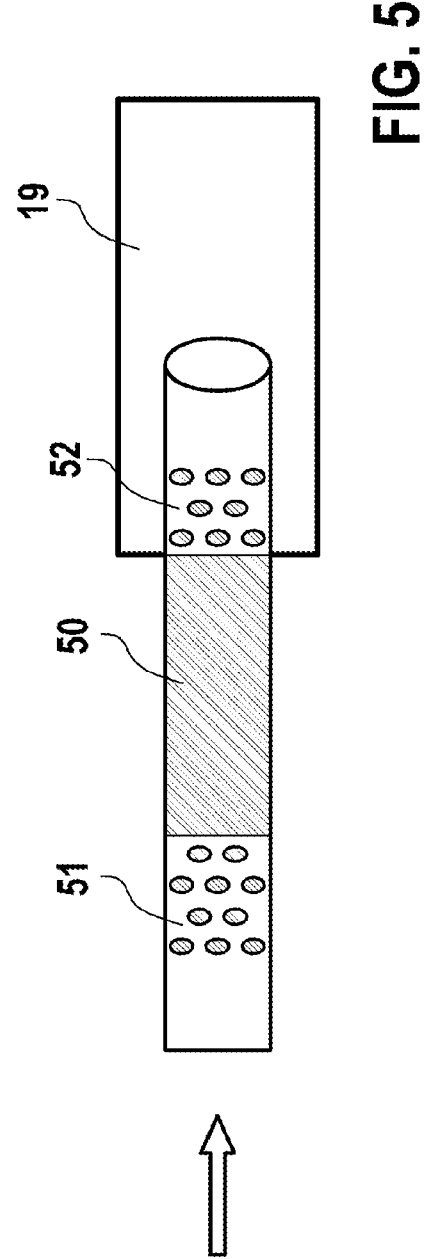
FIG. 5 shows a schematic view of a hydraulic interface channel of a feed module, which channel is blocked by frozen AUS.

If a change into the thawing state occurs as a result of the evaluation of the MSP current $I_{MSP}$ in the second test phase $Z_2$, said thawing state is firstly implemented in the form of a heating assistance phase in the way illustrated in FIG. 4. In this context, the feedback pump 12 is energized constantly, so that its workspace 121 is open. The feed pump 11 carries out pump strokes. In this context, warm AUS is generated. Subsequently, in a pressure build-up phase $Z_4$ the energization of the feedback pump 12 is ended, and in this way the working space 121 of the feedback pump 12 is closed. The feed pump 11 subsequently carries out the pump strokes. As illustrated in FIG. 5, in this context warm AUS is forced into the hydraulic interface channel 19. If the latter is blocked by a frozen region 50 in the feed line, which region is bounded by partially thawed regions 51, 52, accelerated thawing of this region occurs. In the pressure build-up phase $Z_4$ monitoring of the MSP current $I_{MSP}$ occurs in turn. If said MSP current $I_{MSP}$ rises, the hydraulic interface channel 19 and its feed line are not yet free of ice and a renewed change into the heating assistance phase occurs in that the feedback pump 12 is energized again. However, if the MSP current $I_{MSP}$ essentially no longer rises, it is detected that the feed module 10 is then ready for metering.

A change into a thawing state occurs in each of the embodiments of the method described above even instead of a rise in the MSP current $I_{MSP}$ it is detected that an expected measured value of the MSP current $I_{MSP}$ could not be detected, that is to say a pump stroke of the feed pump 11 cannot be assigned a measured value, or at least one measured value of the MSP current $I_{MSP}$ differs by a threshold value from the respective first measured value in the time profile of the MSP current $I_{MSP}$ in the first test phase $Z_1$, of the second test phase $Z_2$, of the venting phase $Z_3$ or of the pressure build-up phase $Z_4$, or if at least one measured value of the MSP current $I_{MSP}$ exceeds a predefined maximum value of, for example, 1800 mA.

In the first test phase $Z_1$ or in the venting phase $Z_3$ a change occurs into the thawing state even if none of the conditions described above is satisfied, and the MSP current $I_{MSP}$ also remains essentially constant but it is detected by means of a software function of the electronic control device 40 that no fluid is located in the working space 111 of the feed pump 11.

In the thawing state and in the phases $Z_1$ to $Z_4$, the electronic control device 40 activates a component protection function of the feed pump 11 and of the feedback pump 12, in order to avoid damage to the pumps 11, 12.

The invention claimed is:

1. A method for operating a feed module (10) of an SCR catalytic converter system which has a feed pump (11), a feedback pump (12) and a hydraulic interface channel (19), wherein the feed module (10) is operated in a test state in which a feed operation of the feed pump (11) takes place and a feed operation of the feedback pump (12) does not take place, wherein owing to a time profile of an MSP current ($I_{MSP}$) of the feed pump (11) it is decided in the test state whether the feed module (10) is to change into a thawing state.

2. The method according to claim 1, characterized in that the feed module (10) is started in a test state in which the feed module (10) is operated in a first test phase ($Z_1$) and in a second test phase ($Z_2$), wherein the feedback pump (12) is opened in the first test phase ($Z_1$) and closed in the second test phase ($Z_2$), and wherein on the basis of a time profile of the MSP current ($I_{MSP}$) in the first test phase ($Z_1$) and on the basis of a time profile of the MSP current ($I_{MSP}$) in the second test phase ($Z_2$) it is decided whether the feed module (10) is to change into the thawing state.

3. The method according to claim 2, characterized in that it is decided that the feed module (10) is to change into the thawing state if, in the first test phase ($Z_1$),
   at least one expected measured value of the MSP current ($I_{MSP}$) cannot be detected, or
   at least one measured value of the MSP current ($I_{MSP}$) differs at least by a first threshold value from the first measured value in the time profile of the MSP current ($I_{MSP}$), or
   a rise in the MSP current ($I_{MSP}$) over time exceeds a second threshold value, or
   at least one measured value of the MSP current ($I_{MSP}$) exceeds a predefined maximum value, or
   a rise in the MSP current ($I_{MSP}$) over time does not exceed the second threshold value but fluid is not detected in a working space (111) of the feed pump (11).

4. The method according to claim 3, characterized in that it is decided that the feed module (10) is to change into the thawing state, if in the second test phase ($Z_2$)
   at least one expected measured value of the MSP current ($I_{MSP}$) cannot be detected, or
   at least one measured value of the MSP current ($I_{MSP}$) differs at least by a first threshold value from the measured value in the time profile of the MSP current ($I_{MSP}$), or
   at least one measured value of the MSP current ($I_{MSP}$) exceeds a predefined maximum value, or
   a rise in the MSP current ($I_{MSP}$) over time exceeds a second threshold value.

5. The method according to claim 1, characterized in that the test state is a ventilation phase ($Z_3$) of the feed module (10), in which phase the feedback pump (12) is opened, wherein it is decided that the feed module (10) is to change into the thawing state if
   at least one predefined number of expected measured values of the MSP current ($I_{MSP}$) cannot be detected within a predefined time interval, or at least one measured value of the MSP current ($I_{MSP}$) differs at least by a first threshold value from the measured value in the time profile of the MSP current ($I_{MSP}$), or at least one measured value of the MSP current ($I_{MSP}$) exceeds a predefined maximum value, or a rise in the MSP current ($I_{MSP}$) over time exceeds a second threshold value, or a rise in the MSP current ($I_{MSP}$) over time does not exceed a second threshold value but fluid is not detected in a working space (111) of the feed pump (11).

6. The method according to claim 1, characterized in that the test state is a pressure build-up phase ($Z_4$) of the feed module (10), in which phase the feedback pump (12) is closed, wherein it is decided that the feed module (10) is to change into the thawing state if within a predefined time interval at least one predefined number of expected measured values of the MSP current ($I_{MSP}$) cannot be detected, or at least one measured value of the MSP current ($I_{MSP}$) differs at least by a first threshold value from the measured value in the time profile of the MSP current ($I_{MSP}$), or at least one measured value of the MSP current ($I_{MSP}$) exceeds a predefined maximum value, or a rise in the MSP current ($I_{MSP}$) over time exceeds a second threshold value.

7. The method according to claim 6, characterized in that the pressure build-up phase ($Z_4$) follows a heating assistance phase for the hydraulic interface channel (19), in which a heating operation and a feed operation of the feed pump (11) take place at the same time and in which the feedback pump (12) is opened.

8. The method according to claim 7, characterized in that the heating assistance phase is a thawing operation into which the feed module (10) is changed after it has been decided in the second test phase ($Z_4$) that the feed module (10) is to change into a thawing operation, wherein it is decided that the feed module (10) is to change into the thawing state, if in the second test phase ($Z_2$)

at least one expected measured value of the MSP current ($I_{MSP}$) cannot be detected, or at least one measured value of the MSP current ($I_{MSP}$) differs at least by a first threshold value from the measured value in the time profile of the MSP current ($I_{MSP}$), or at least one measured value of the MSP current ($I_{MSP}$) exceeds a predefined maximum value, or a rise in the MSP current ($I_{MSP}$) over time exceeds a second threshold value.

9. The method according to claim 3, characterized in that it is decided that the feed module (10) is to change into the thawing state, if in the second test phase ($Z_2$) at least one expected measured value of the MSP current ($I_{MSP}$) cannot be detected.

10. The method according to claim 3, characterized in that it is decided that the feed module (10) is to change into the thawing state, if in the second test phase ($Z_2$) at least one measured value of the MSP current ($I_{MSP}$) differs at least by a first threshold value from the measured value in the time profile of the MSP current ($I_{MSP}$).

11. The method according to claim 3, characterized in that it is decided that the feed module (10) is to change into the thawing state, if in the second test phase ($Z_2$) at least one measured value of the MSP current ($I_{MSP}$) exceeds a predefined maximum value.

12. The method according to claim 3, characterized in that it is decided that the feed module (10) is to change into the thawing state, if in the second test phase ($Z_2$) a rise in the MSP current ($I_{MSP}$) over time exceeds a second threshold value.

13. The method according to claim 1, characterized in that the test state is a ventilation phase ($Z_3$) of the feed module (10), in which phase the feedback pump (12) is opened, wherein it is decided that the feed module (10) is to change into the thawing state if at least one predefined number of expected measured values of the MSP current ($I_{MSP}$) cannot be detected within a predefined time interval.

14. The method according to claim 1, characterized in that the test state is a ventilation phase ($Z_3$) of the feed module (10), in which phase the feedback pump (12) is opened, wherein it is decided that the feed module (10) is to change into the thawing state if at least one measured value of the MSP current ($I_{MSP}$) differs at least by a first threshold value from the measured value in the time profile of the MSP current ($I_{MSP}$).

15. The method according to claim 1, characterized in that the test state is a ventilation phase ($Z_3$) of the feed module (10), in which phase the feedback pump (12) is opened, wherein it is decided that the feed module (10) is to change into the thawing state if at least one measured value of the MSP current ($I_{MSP}$) exceeds a predefined maximum value.

16. The method according to claim 1, characterized in that the test state is a ventilation phase ($Z_3$) of the feed module (10), in which phase the feedback pump (12) is opened, wherein it is decided that the feed module (10) is to change into the thawing state if a rise in the MSP current ($I_{MSP}$) over time exceeds a second threshold value.

17. The method according to claim 1, characterized in that the test state is a ventilation phase ($Z_3$) of the feed module (10), in which phase the feedback pump (12) is opened, wherein it is decided that the feed module (10) is to change into the thawing state if a rise in the MSP current ($I_{MSP}$) over time does not exceed a second threshold value but fluid is not detected in a working space (111) of the feed pump (11).

18. A non-transitory computer-readable storage medium, storing instructions that when executed by a computer cause the computer to carry out the method of claim 1.

19. An electronic control device (40) configured to operate a feed module (10) of an SCR catalytic converter system by means of the method of claim 1.

* * * * *